United States Patent [19]
Donofrio

[11] 3,780,586
[45] Dec. 25, 1973

[54] ORAL THERMOMETER
[76] Inventor: David J. Donofrio, 1407 Herberich Ave., Akron, Ohio 44301
[22] Filed: July 6, 1971
[21] Appl. No.: 159,962

[52] U.S. Cl. .................................. 73/374, 206/16.5
[51] Int. Cl. ............................................. G01k 1/14
[58] Field of Search ................ 73/371, 374, 343 R; 206/16.5

[56] References Cited
UNITED STATES PATENTS

| | | | |
|---|---|---|---|
| 856,768 | 6/1907 | Comins | 73/343 R |
| 3,695,110 | 10/1972 | Biolik | 73/343 R |
| 2,077,039 | 4/1937 | Collens | 73/374 |
| 2,677,965 | 5/1954 | Saffir | 73/374 X |
| 2,445,539 | 7/1948 | Singer | 73/371 |
| 2,817,236 | 12/1957 | Van Alstyne, Jr. | 73/371 |
| 2,662,407 | 12/1953 | Hunt | 73/376 |
| 2,240,980 | 5/1941 | Carlson | 73/376 |

FOREIGN PATENTS OR APPLICATIONS

| | | | |
|---|---|---|---|
| 17,126 | 8/1903 | Great Britain | 73/371 |

Primary Examiner—Richard C. Queisser
Assistant Examiner—Daniel M. Yasich
Attorney—Albert H. Oldham et al.

[57] ABSTRACT

This application relates to an oral thermometer in the form of a glass tube having an expanded bulb at one end thereof. Mercury is in the bulb and the tube. A resilient flanged portion made of plastic or other suitable material is either as an integral part of or able to be attached to the tube, which serves to properly position the thermometer under the tongue in a person's mouth, and to hold the thermometer in a fixed position while the person's temperature is taken.

9 Claims, 10 Drawing Figures

PATENTED DEC 25 1973 3,780,586
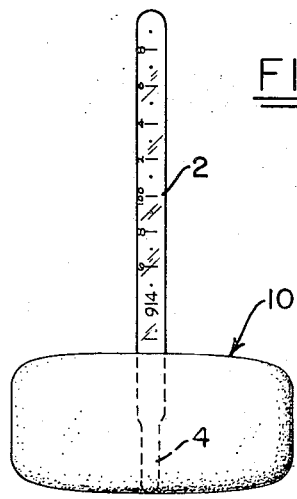
FIG.-1
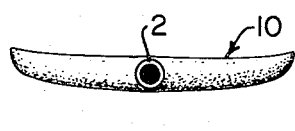
FIG.-2
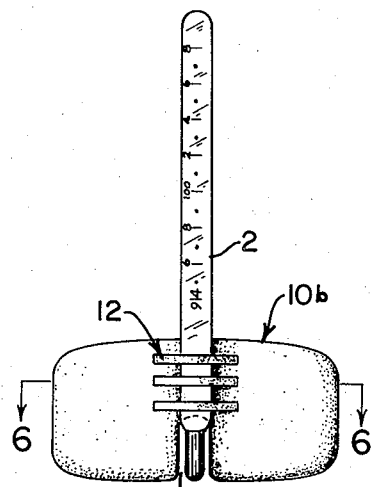
FIG.-5
FIG.-6
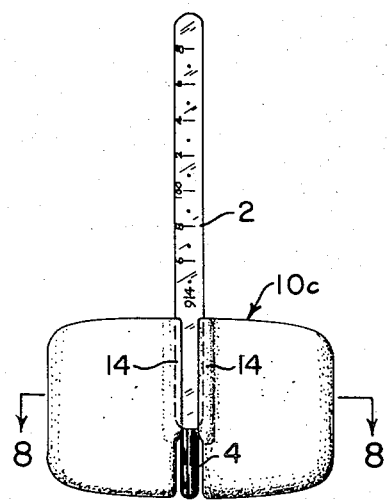
FIG.-7
FIG.-8
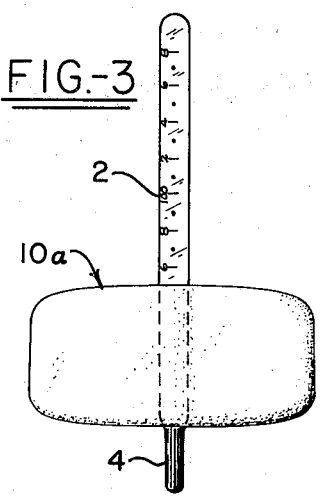
FIG.-3
FIG.-4
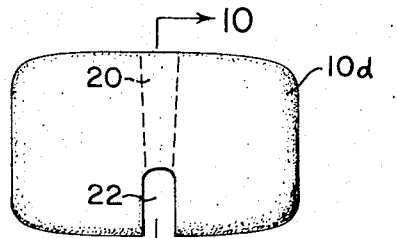
FIG.-9
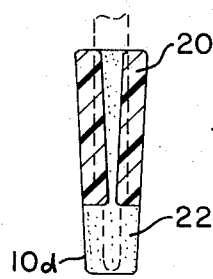
FIG.-10
INVENTOR
DAVID J. DONOFRIO
BY
Oldham & Oldham
ATTORNEYS

ORAL THERMOMETER

BACKGROUND OF THE INVENTION

There are several considerations which must be taken into account when attempting to obtain an accurate temperature reading from the use of an oral thermometer. To obtain an accurate temperature reading from an oral thermometer it is very important that the thermometer be placed in a certain position under a person's tongue and that the thermometer not be moved into different positions in the mouth during the time when the temperature reading is being obtained.

Heretofore oral thermometers have generally been made using a straight glass tube with a slightly expanded bulb on one end thereof. It is difficult with this type of thermometer to place the thermometer in a predetermined position under the tongue and to hold it in that position. The person whose temperature is being taken, will generally cause the thermometer to move into different positions in his mouth during the time when the temperature reading is being obtained. Further, even if the thermometer does not move after it is positioned, it is nearly impossible to duplicate the thermometer's position each time that is is utilized to obtain a person's temperature. It is a known fact that the temperature may vary in different positions in a person's mouth. Therefore, with the use of present thermometers temperature readings may vary depending on the placement of the oral thermometer in the mouth.

A further problem in the use of present glass oral thermometers is that breakage of the thermometer may be caused by movement of the thermometer in the mouth, thus expelling mercury into the person's system.

Therefore, it is the general object of this invention to provide a means of positioning an oral thermometer to a predetermined position in a person's mouth and to hold the oral thermometer stationary in said predetermined position during the time when the temperature reading is being obtained.

A further object is to make it easier for the person to hold the thermometer in such predetermined position.

A further object is to substantially eliminate the possibility of the thermometer breaking in a person's mouth.

The aforesaid objects of the invention and other objects which will become apparent as the description proceeds are achieved by providing a resilient flanged portion attached to the glass thermometer tube where said flanged portion conforms with the normal curvature of the under surface of the tongue and thereby holds the thermometer in a predetermined position under the tongue during the time a temperature reading is being obtained.

More specifically the invention relates to an improvement in an oral thermometer having a long closed tube, a bulb at one end of the tube, and an expandable liquid in the bulb which comprises a very shallow U-shaped member attached to or formed as a part of the thermometer so as to be adjacent the bulb with the tube lying substantially in the plane of the member at about the center thereof, said member being shaped to conform on the top surface to the bottom side of the human tongue, on the bottom surface to the inside of a human tongue, on the bottom surface to the inside of a human mouth beneath the tongue, and along the sides to the lateral confines of the human mouth beneath the tongue, with sufficient tolerance in all directions so as to conform to the normal range in size of human mouths.

For a better understanding of the invention, reference should be had to the accompanying drawings wherein:

FIG. 1 is a plan view of a preferred embodiment of the invention;

FIG. 2 is an end elevational view of the thermometer of FIG. 1;

FIG. 3 is a plan view illustrating an alternate embodiment of the flanged portion of the thermometer;

FIG. 4 is an end elevation view of the thermometer of FIG. 3;

FIG. 5 is a plan view showing a detachable resilient flange unit fitted on to the end of a common thermometer;

FIG. 6 is an end elevational view of the thermometer and flange of FIG. 5;

FIG. 7 is a top view of another embodiment showing an attachable flange;

FIG. 8 is an end elevational view of the thermometer and flange as shown in FIG. 7;

FIG. 9 is a plan view of another modified embodiment of the invention; and

FIG. 10 is a cross-sectional illustration of the tapered hole taken on line 10—10 of FIG. 9.

With reference to FIG. 1 of the drawings, the oral thermometer of this invention has a glass tube 2 with an expanded bulb 4. A resilient flange 10 is shaped so as to conform to the normal curvature of the under surface of the tongue. As shown in FIG. 2 the resilient material of the flange 10 is very thin above and below the bulb 4 to allow maximum transfer of heat from the mouth of the user into the mercury contained in bulb 4, so in effect to not interfere with the normal operation of the thermometer.

The flange portion 10 may also be attached only to the tube 2 leaving the bulb 4 completely exposed to the heat of the user's mouth as shown in FIG. 3. The flange 10 may be molded directly onto and around the glass of the tube 2 and bulb 4 as shown in FIGS. 1 and 2. A resilient, moldable synthetic plastic could be used for molding the flange 10 onto the glass of the tube 2 and bulb 4 in this embodiment of the invention. This synthetic resin would be of a type easily moldable and have the additional property of good adhesion to glass. FIGS. 3 and 4 illustrate an integral flange 10a similar to the flange 10 in shape and thickness attached to the tube 2 above the bulb 4.

An alternate embodiment of this invention would be to use a detachable resilient flange fastened onto the glass tube 2. FIG. 5 illustrates a flange 10b held in place on the tube 2 and bulb 4 by flexible straps 12 integrally formed in the flange 10b. A thermometer of the present standard oral type could then easily be slipped into the pocket formed by the straps 12 on the flange 10b thus holding the flange 10b securely in place on the thermometer. FIG. 6 illustrates the pocket formed by the straps 12 into which a common type oral thermometer could be inserted. The straps 12 would preferably be resilient. In this embodiment of the invention with the cut away portion at 11 the bulb 4 is exposed on all sides, to the heat of the person's mouth using the thermometer. With this type of attaching arrangement, the flange 10b could be then positioned on the tube 2 in any desired position, thus the flange 10b could be positioned so as to expose the entire bulb 4 to the heat of the person's mouth using the thermometer.

FIG. 7 illustrates an alternate means of attaching the flange 10c to the tube 2 of a present standard oral thermometer. In this embodiment of the invention flexible members 14 snap into place around the thermometer tube 2. Pressing down the ends of the flange 10c as shown by arrows 16, while at the same time, stabilizing (or exerting an improved force) the flange 10c as shown by the arrow 17 in FIG. 8 would serve to open the flexible members 14 thus affecting release or attachment of the thermometer from the flange 10c. The flange 10c may take various shapes but preferably would conform to the normal curvature of the undersurface of the tongue, thus serving to hold the thermometer in a desired position under the tongue.

FIGS. 9 and 10 illustrate a modified embodiment of the invention where the flange 10d has a molded tapered hole 20, and open end portion 22. A thermometer may be positioned through the hole 20 so that it wedges into the tapered portion and the bulb is exposed on all sides at the open portion 22.

The flanges defined in the various embodiments of the invention may be made of various resilient materials. It may be formed of rubber or of various other synthetic plastic materials. It is necessary that the resilient material used be insoluable in water, alcohol, or other organic solvents used to sterilize oral thermometers, and should be of a non-toxic substance safe for use in the human mouth. The resilient material used, also should have as high a coefficient of thermal conductivity as possible so as not to significantly increase the time for the thermometer to reach an accurate temperature reading.

A typical clear plastic material which would be suitable to form the molded on flange of the embodiment of FIGS. 1-4, or the separately attached flanges of FIGS. 5-8 would be Geon, a polyvinylchloride manufactured by the B. F. Goodrich Rubber Company. A thickness of the flange over the bulb of between 0.001 inch to 0.02 inches does not significantly increase the time for the thermometer to function properly.

It should also be pointed out that other elastomeric materials such as rubber may be used to coat the thermometer and that the flange may be integrally formed as part of the glass of the thermometer, or from metal.

While several complete embodiments of the invention have been disclosed herein, it will be appreciated that modification of these particular embodiments of the invention may be resorted to without departing from the scope of the invention as defined in the appended claims.

What is claimed is:

1. An oral thermometer comprising:
   an elongated sealed glass tube;
   an expanded bulb at one end of said glass tube;
   a liquid in said bulb and said tube which expands with heat;
   a means for positioning and holding said bulb and said tube in a fixed position under the tongue in a person's mouth comprising a resilient flange element arcuate shaped and sized so as to conform to the undersurface of the human tongue, said flange element affixed to said bulb and said tube to position the thermometer in a fixed position under the tongue and to hold the thermometer in place under the tongue while said thermometer is in use.

2. An oral thermometer as in claim 1 wherein the resilient flange element is made from a synthetic plastic material chemically resiliant to alcohol and other solvents used to sterilize thermometers.

3. An oral thermometer as in claim 1 wherein the resilient flange element is made from a synthetic plastic material chemically safe for contacting the human mouth.

4. An oral thermometer as in claim 1 wherein the resilient flange element is molded onto a glass thermometer tube and bulb completely covering said tube and bulb.

5. An oral thermometer as in claim 1 wherein the resilient flange element is molded onto a glass thermometer tube adjacent to a glass bulb thereon, leaving said bulb completely exposed.

6. An oral thermometer as in claim 1 wherein the resilient flange element is attached to a glass thermometer tube by means of flexible straps forming a pocket in which the thermometer tube is held securely.

7. An oral thermometer as in claim 1 wherein the resilient flange element is attached to a glass thermometer tube by means of flexible curved clip members which form a groove in which the said tube is held.

8. An oral thermometer according to claim 1 where the flange element is a separately molded plastic attachment having a tapered hole to receive and wedge a thermometer therein, and a cut away portion to expose the bulb with the thermometer in the wedged position.

9. An oral thermometer as in claim 1 wherein the resilient flange element is made from a synthetic plastic material with a high coefficient of thermal conductivity.

* * * * *